Patented Nov. 27, 1934

1,982,018

UNITED STATES PATENT OFFICE 1,982,018

COATED PAPER

Allen F. Owen, Glenbrook, Conn., assignor to The Naugatuck Chemical Company, Naugatuck, Conn., a corporation of Connecticut No Drawing. Application November 14, 1931, Serial No. 575,145

4 Claims. (Cl. 91—68)

This invention relates to coated papers and coating compositions for paper products.

Coated papers have been developed within comparatively recent years to give a paper that would reproduce half tones, and the like, more clearly. An improved printing surface is obtained by applying to the paper a thin layer of mineral material such as finely divided clay, satin white, Paris white, blanc fixe, and the like, and an adhesive material, commonly casein, but in some cases glue, starch, albumin and shellac. An improvement in the qualities of coated papers has recently been effected by the addition to the coating composition of small quantities of an aqueous dispersion of rubber such as natural or artificial latex. There results with the addition of small amounts of an aqueous dispersion of rubber, a greatly increased folding value, a decrease in ink absorption, an improved printing surface, and a great decrease in curling and offset. These improved properties are somewhat lessened after the coated paper has been allowed to stand for a period of time, due to the drying out of the adhesive material and the rubber, and also in a slight degree to the oxidation of the rubber.

This invention relates to coated papers having a coating composition, such that the drying out effect will not be produced even after long periods of time, and in which the coated surface will not "crack", "pick" or "fuzz up" as in the cases where a drying out of the coating takes place.

In carrying out the invention, to a coating composition, which ordinarily contains mineral matter and adhesive, and which also may contain an aqueous dispersion of rubber, I add a hygroscopic agent, such as glycerine, diethyleneglycol, ethyleneglycol, triethanolamine, or the like. Triethanolamine and chemicals of similar nature will tend to hold moisture in the coating and exert on the adhesive, such as casein, and on the rubber, if present, a softening effect. This softening effect is of great importance in coated papers because the coated surface will not "crack", "pick" or "fuzz up" if the rubber and/or adhesive are kept in a pliable condition. The softening effect of triethanolamine or similar substances will also maintain the velvety feel that is characteristic of a coated paper containing rubber. Further, in coated papers containing rubber, the triethanolamine will also act as an antioxidant and thus prevent oxidation of the rubber in the composition.

As a specific illustration of one manner of carrying out the invention, but without intention to limit the invention except as required by the prior art, the following example of a coating composition is included:

| | Parts by weight |
|---|---|
| China clay | 500 |
| Satin white | 300 |
| Casein | 150 |
| Rubber (as solids in normal latex) | 50 |
| Triethanolamine | 2 |

When rubber is used in coated papers, vulcanizing and accelerating agents may or may not be included in the composition, or the dispersion may be pre-vulcanized, as is well known in the art. If an aqueous dispersion of rubber containing vulcanizing ingredients is used, a subsequent vulcanization of the coating is desirable which may take place during subsequent drying and calendering operations. With well known ultra accelerators, such vulcanization may take place at room temperatures. However, it is in no way necessary, nor desirable in many cases, to provide a vulcanized rubber in the coating when a rubber addition is made thereto. When the mineral material, adhesive and hygroscopic agent alone form the coating composition, the hygroscopic agent may be added to the adhesive material or to the coating composition as prepared. When rubber is present, the hygroscopic agent may be added to the aqueous dispersion of rubber and this composition added to the adhesive material or to the coating composition as prepared, or the materials may be otherwise mixed as desired. It is understood that various ingredients in various proportions may be employed within the scope of the invention. For example, china clay and satin white are included in the above composition, but china clay or other types of clay material may be used alone, or mineral substances other than satin white, such as blanc fixe, and Paris white may be included in the coating composition as is well known in the art. As a rule, the mineral material comprises a major proportion of the coating composition, usually around 80% thereof, but this may be varied for different paper products. A minor proportion of the coating composition will include such adhesive materials as casein, starch, glue, albumin, shellac, and the like, together with a small proportion of a hygroscopic agent, which, when no rubber is present, is preferably within the range of .1 to 2% of the final coating composition. When an aqueous dispersion of rubber, such as rubber latex, is included in the composition, such is preferably present in the proportion of 1 to 15% of rubber solids in the final coating composition, and the hygroscopic agent is preferably present in amounts approximately 1 to 10% of the rubber solids content.

In view of the many changes and modifications that may be made without departing from the principles underlying the invention, reference should be made to the appended claims for an understanding of the scope of the invention.

Having thus described my invention, what I claim and desire to protect by Letters Patent is:

1. A coated paper consisting of paper coated with a mixture comprising a major proportion of mineral material, and casein, rubber solids of an aqueous dispersion of rubber, and triethanolamine in minor proportion.

2. A coated paper consisting of paper coated with a mixture comprising a major proportion of mineral material, and casein, rubber solids of latex, and triethanolamine in minor proportion.

3. A coated paper consisting of paper coated with a mixture comprising about 80% of mineral material, 1 to 15% rubber solids of an aqueous dispersion of rubber, triethanolamine approximately 1 to 10% of the rubber solids content, and the remainder adhesive material from the group consisting of casein, starch, glue, albumin and shellac.

4. A coated paper consisting of paper coated with a mixture comprising about 80% of mineral material, 1 to 15% rubber solids of an aqueous dispersion of rubber, triethanolamine approximately 1 to 10% of the rubber solids content, and the remainder casein.

ALLEN F. OWEN.